(12) United States Patent
Newman et al.

(10) Patent No.: US 12,320,144 B2
(45) Date of Patent: Jun. 3, 2025

(54) CONCEPTS UNDERWATER COMMUNICATION WITH EQUIPMENT SUCH AS AUTOMATIC SWIMMING POOL CLEANERS

(71) Applicant: ZODIAC POOL SYSTEMS LLC, Carlsbad, CA (US)

(72) Inventors: Phillip Newman, Howick (ZA); Hendrikus Johannes van der Meijden, Midrand (ZA)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 203 days.

(21) Appl. No.: 17/395,991

(22) Filed: Aug. 6, 2021

(65) Prior Publication Data

US 2022/0042337 A1 Feb. 10, 2022

Related U.S. Application Data

(60) Provisional application No. 63/061,916, filed on Aug. 6, 2020.

(51) Int. Cl.
| | | |
|---|---|---|
| *E04H 4/16* | (2006.01) | |
| *C02F 1/00* | (2023.01) | |
| *C02F 103/42* | (2006.01) | |
| *G05D 1/00* | (2024.01) | |
| *G08C 23/02* | (2006.01) | |
| *H04B 11/00* | (2006.01) | |

(52) U.S. Cl.
CPC ............ *E04H 4/1654* (2013.01); *C02F 1/001* (2013.01); *C02F 1/008* (2013.01); *G05D 1/0016* (2013.01); *G08C 23/02* (2013.01); *H04B 11/00* (2013.01); *C02F 2103/42* (2013.01); *C02F 2209/008* (2013.01)

(58) Field of Classification Search
CPC ...... C02F 1/001; C02F 1/008; C02F 2103/42; C02F 2209/008; E04H 4/1654; G01S 3/8083; G01S 5/186; G05D 1/0016; G05D 2201/0203; G08C 23/02; H04B 11/00
USPC .......................................................... 15/1.7
See application file for complete search history.

(56) References Cited

U.S. PATENT DOCUMENTS

| | | | |
|---|---|---|---|
| 5,435,031 A * | 7/1995 | Minami ................ E04H 4/1654 15/1.7 |
| 9,250,626 B2 | 2/2016 | Michelon | |
| 10,167,650 B2 | 1/2019 | Torem et al. | |
| 10,942,990 B2 * | 3/2021 | Bennett .................. G06N 3/008 |
| 2018/0044936 A1 * | 2/2018 | Torem ................... E04H 4/1654 |

(Continued)

OTHER PUBLICATIONS

International Application No. PCT/US2021/044954, Invitation to Pay Additional Fees and, Where Applicable, Protest Fee mailed on Nov. 22, 2021, 5 pages.

(Continued)

*Primary Examiner* — Terry K Cecil
(74) *Attorney, Agent, or Firm* — Kilpatrick Townsend & Stockton LLP

(57) ABSTRACT

Techniques and methods for wirelessly communicating underwater with equipment such as, but not necessarily limited to, automatic swimming pool cleaners (APCs) are detailed. Such communication avoids any need for conventional wired communication with the APCs. In some cases sounds may be used to communicate, and such sounds may travel through both air and water.

29 Claims, 3 Drawing Sheets

(56) References Cited

U.S. PATENT DOCUMENTS

| | | |
|---|---|---|
| 2019/0087548 A1 | 3/2019 | Bennett et al. |
| 2020/0063454 A1 | 2/2020 | Attar et al. |
| 2020/0311227 A1* | 10/2020 | Bennett ................. G06F 21/602 |
| 2021/0199525 A1* | 7/2021 | Goldenberg .......... G01L 9/0044 |

OTHER PUBLICATIONS

International Application No. PCT/US2021/044954, International Search Report and Written Opinion mailed on Jan. 14, 2022, 18 pages.
International Application No. PCT/US2021/044954, International Preliminary Report on Patentability mailed on Feb. 16, 2023, 12 pages.
European Application No. 21762890.8, Office Action mailed on Dec. 2, 2024, 7 pages.

* cited by examiner

CONCEPTS UNDERWATER COMMUNICATION WITH EQUIPMENT SUCH AS AUTOMATIC SWIMMING POOL CLEANERS

REFERENCE TO RELATED APPLICATION

This application claims the benefit of U.S. Provisional Patent Application No. 63/061,916, filed on Aug. 6, 2020, and entitled CONCEPTS AND METHODS FOR UNDERWATER COMMUNICATION WITH EQUIPMENT SUCH AS AUTOMATIC SWIMMING POOL CLEANERS, the content of which is hereby incorporated by reference in its entirety.

FIELD OF THE INVENTION

This invention relates to communicating with equipment operating underwater and more particularly, although not necessarily exclusively, to concepts and methods for communicating underwater with autonomous vehicles such as automatic pool cleaners ("APCs") configured to operate in swimming pools or spas.

BACKGROUND

U.S. Pat. No. 9,250,626 to Michelon describes an exemplary apparatus (often called a "robot" or a "robotic APC") for cleaning a swimming pool. The apparatus includes wheels or other motive elements and is configured to travel autonomously within the pool. It further may be connected via cable to an "intermediate relay," or control box, positioned near the pool. The external control box may receive signals from a wireless transmitter of a remote control device and forward control information to the cleaning apparatus through the cable. In particular, because of known difficulties in transmitting wireless radio frequency (RF) signals substantial distances through water, the control box is not positioned within the pool, nor does the wireless transmitter of the remote control device communicate directly with the underwater APC. The control box thus indeed functions as an "intermediate relay," in that it receives control information wirelessly externally of the pool and relays it via wire to the submerged cleaner within the pool.

U.S. Patent Application Publication No 2020/0063454 of Attar, el al, discusses another robotic APC to which a control cable is connected. Consistent with conventional devices, the cleaner of the Attar application receives signals via wire from an external source. As noted in the Attar application, the cable is subject to being pulled for various reasons; although such pulling is disadvantageous in some cases, the cleaner of the Attar application describes using sensed directional pulling information to control certain movements of the cleaner.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, an automatic swimming pool cleaner includes a housing, a communication sensor, and a controller. The automatic swimming pool cleaner may be at least partially submerged within water of a swimming pool or spa, and the communication sensor may receive a sound signal while the automatic swimming pool is at least partially submerged. The controller may receive an electrical signal from the communication sensor, where the electrical signal has at least one characteristic, determine a control response for the automatic swimming pool cleaner based on the at least one characteristic, and control the automatic swimming pool cleaner pursuant to the determined control response.

According to some embodiments, a pool system includes an automatic swimming pool cleaner. The automatic swimming pool cleaner includes a housing, a communication sensor, and a controller, and the automatic swimming pool cleaner may be at least partially submerged within water of a swimming pool. The communication sensor may receive a sound signal while the automatic swimming pool is at least partially submerged, and the controller may control the automatic swimming pool cleaner responsive to the received sound signal.

According to various embodiments, a method of controlling an automatic swimming pool cleaner within a pool includes receiving a sound signal using a communication sensor on the automatic swimming pool cleaner, the sound signal comprising at least one characteristic. The method also includes determining a control response using a controller on the automatic swimming pool cleaner based on the received sound signal and the at least one characteristic, and controlling the automatic swimming pool cleaner pursuant to the determined control response.

According to some embodiments, a method of communicating with an automatic swimming pool cleaner at least partially submerged within water of a swimming pool or spa includes creating a sound configured for receipt by a sound-receiving means of the automatic swimming pool cleaner.

In certain embodiments, the sound-receiving means may include a microphone or an ultrasonic transducer. In various embodiments, the sound is created externally of the swimming pool and furnishes an operating instruction to the automatic swimming pool cleaner. In some embodiments, the operating instruction may be selected from the group consisting of: making linear movements; making rotational movements; energizing components; surfacing the automatic swimming pool cleaner; and deactivating components of the automatic swimming pool cleaner.

According to certain embodiments, an automatic swimming pool cleaner includes means for receiving and processing sounds.

In various aspects, the automatic swimming pool cleaner may include a microphone or ultrasonic transducer for receiving audible or ultrasonic signals, respectively. In some cases, the means for receiving and processing sounds is configured to receive a sound signal while the automatic swimming pool is at least partially submerged and determine a control response for the automatic swimming pool cleaner based on at least one characteristic of the sound signal. In certain embodiments, the control response is selected from the group consisting of: making linear movements; making rotational movements; energizing components; surfacing the automatic swimming pool cleaner; and deactivating components of the automatic swimming pool cleaner.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for communicating with equipment, such as an APC, when submerged in a pool. In certain aspects, the systems and methods described herein may avoid a need for any wired communication with an APC, and the communication may be a wireless communication. Beneficially (but not necessarily), the sources of the communications may be located outside of the pools and thus transmit to APCs through both air and water. Although the systems and methods are described for use in connection with water containing vessels, persons skilled in the relevant field will recognize that the present invention may be employed in other manners.

Figure 1:
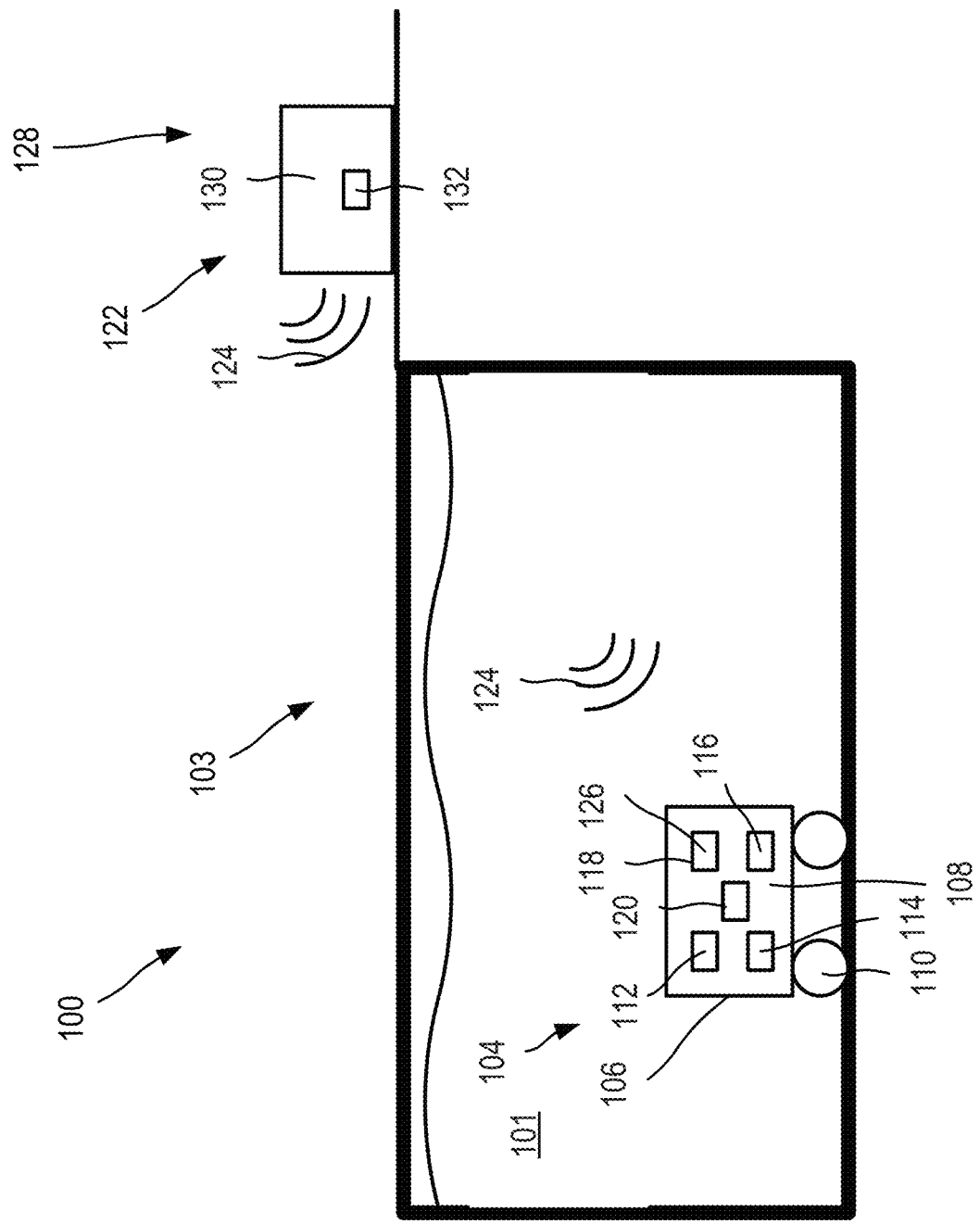
FIG. 1 illustrates a pool system with a communication system according to embodiments of the disclosure.
Figure 2:
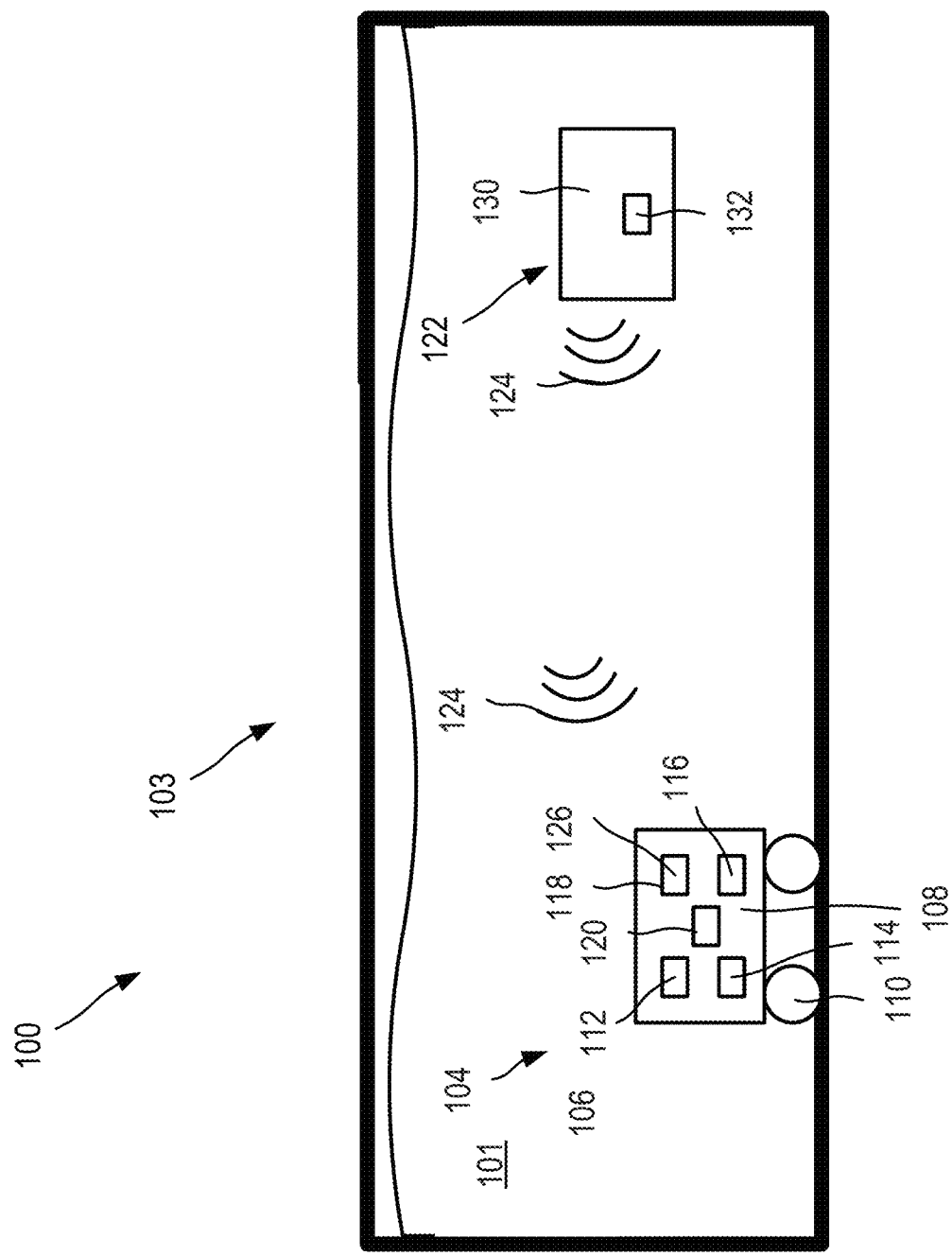
FIG. 2 is another illustration of the pool system of FIG. 1.

FIGS. 1 and 2 illustrate an example of a pool system 100 according to various embodiments. The pool system 100 includes a body of water 101 and a communication system 103 for controlling at least one piece of equipment 104 submerged in the body of water 101. Optionally, the communication system 103 includes a sound generator 122.

In the embodiment of FIGS. 1 and 2, the piece of equipment 104 is a battery-powered, robotic APC 106 that may be submerged within the water 101. The APC 106 includes a body 108, a communication sensor 118, and a controller 120 communicatively coupled to the communication sensor 118. The communication sensor 118 may be various suitable devices or combinations of devices for receiving transmitted sounds 124 and/or other signals, such as from the sound generator 122. In the embodiment of FIG. 1, the communication sensor 118 is a microphone 126 on the APC 106 that may receive the sounds 124 and convert them, in conventional manner, into electrical signals that may be transmitted to the controller 120.

In some embodiments, the communication sensor 118 optionally may be positioned on a printed circuit board (PCB) within a motor block of the body 108 of the APC 106 in these examples, the communication sensor 118 may be in a sealed compartment or area of the APC 106 and/or otherwise isolated from the water 101, thereby minimizing possible detrimental effects of pool water on the communication sensor 118. In other embodiments, the communication sensor 118 may be located elsewhere on or in the APC 106. In certain embodiments, the communication sensor 118 may optionally be remote from (e.g., not physically attached to) the APC 106, including, but not limited to, a remote location within the body of water 101 and/or a remote location 128 outside the body of water 101.

While a single communication sensor 118 is illustrated in FIG. 1, in other embodiments, the APC 106 may include more than one communication sensor 118, such as two communication sensors 118, three communication sensors 118, or more than three communication sensors 118. In such embodiments, the plurality of communication sensors 118 may be the same type of communication sensor (e.g., they are all microphones 126) or may be different types of communication sensors (e.g., one is a microphone and another is an ultrasonic transducer or other receiver as desired). In one non-limiting embodiment, an APC 106 may include at least at least two microphones, ultrasonic transducers, and/or other receivers as communication sensor 118 spaced about the APC 106, or at least three microphones, ultrasonic transducers, and/or other receivers as communication sensor 118 spaced about the APC 106. Including at least two microphones, ultrasonic transducers, and/or other receivers as communication sensor 118 spaced about the APC 106 optionally may facilitate a determination of the location and/or orientation of the piece of equipment 104 within the water 101, as discussed below.

The controller 120 may be various suitable computing devices as desired with a processor and/or a memory. In certain embodiments, the memory may be coupled to the processor, and the memory may include instructions that may be executed by the processor. In various embodiments, the controller 120 receives the electrical signals from the communication sensor 118 and processes them to control the APC 106. In some embodiments, the controller 120 optionally may be operably coupled to various sub-components of the APC 106 (e.g., motor, pump, debris filter, etc.) and may selectively control those sub-components, optionally based on the electrical signals from the communication sensor 118. As some non-limiting examples, and as discussed in detail below, based on the electrical signals from the communication sensor 118, the controller 120 may control a position and/or orientation of the APC 106 within the water 101, a direction of travel of the APC 106 within the water 101, an activation of a pump or motor, combinations thereof, or other suitable controls as desired. Optionally, the APC 106 may travel within the water 101 of the pool system 100 and may be programmed to come to rest on the bottom surface of the pool when a cleaning cycle is completed and/or when its battery is low.

As mentioned, in addition to the communication sensor(s) 118 and the controller 120, the APC 106 may include other optional features as desired. Optionally, the APC may include one or more motive elements 110 for moving the APC 106 within the body of water 101. Suitable motive elements 110 include, but are not limited to, wheels, tracks, rollers, feet, combinations thereof, and/or other suitable devices or mechanisms as desired. Additionally or alternatively, the APC 106 may also include one or more of an electric motor 112, a pump 114, and a debris filter 116. In certain embodiments, the components of the APC 106 optionally may be communicatively coupled to the controller 120 and/or selectively controlled by the controller 120. The particular features illustrated with the APC 106 should not be considered limiting, and in other embodiments, the APC 106 may include fewer and/or additional features as desired. As two non-limiting examples, in other embodiments, the APC 106 may be similar to that described in U.S. Pat. No. 9,250,626 to Michelon or in U.S. Patent Application Publication No. 2020/0063454 of Attar, et al., both of which are hereby incorporated by reference in their entireties. In other embodiments, the piece of equipment 104 may be other pieces of equipment for a pool as desired.

In addition to the piece of equipment 104, the communication system 103 optionally includes the sound generator 122, which may be used to control the piece of equipment 104 using sound 124. In various embodiments, the sound generator(s) 122 optionally may be various suitable devices or components for generating the sound 124, including, but not limited to, various mechanical and/or electrical devices as desired. In other embodiments, the sound generator 122 may be a human, eliminating the need for electrical or mechanical sound maker and providing an easy, hands free technique for communicating with the APC. In the embodiment of FIG. 1, the sound generator 122 is a mechanical sound generator 130 with a sound maker 132 that selectively generates the sound 124.

The sound 124 generated by the sound generator 122 may be various types of sounds as desired, and the sound 124 need not be a sound audible to a human. As some non-limiting examples, the sound 124 generated by the sound generator 122 may include, but is not limited to, audible pulses made by stomping feet or clapping hands, spoken words, ultrasonic signals, low frequency sounds below normal audible ranges, combinations thereof, and/or other sounds 124 as desired for communicating with the piece of equipment 104. In some embodiments, and as illustrated in FIG. 1, the sound generator 122 may be provided at a location 128 that is outside of the body of water 101 such that the sound 124 travels both through air and the water 101. In other embodiments, and as illustrated in FIG. 2, the sound generator 122 may be provided in the body of water 101 such that the sound generator 122 is underwater and sound 124 travels only underwater.

While a single sound generator 122 is illustrated in FIGS. 1 and 2, in other embodiments, the pool system 100 may have any desired number of sound generators 122 as desired. In certain embodiments, the pool system 100 may include at least two sound generators 122 spaced about the body of water 101. In some embodiments, and as discussed in detail below, employing at least two sound generators 122 spaced about the water 101 may optionally facilitate a determination of the location of the piece of equipment 104 within the water 101.

Figure 3:
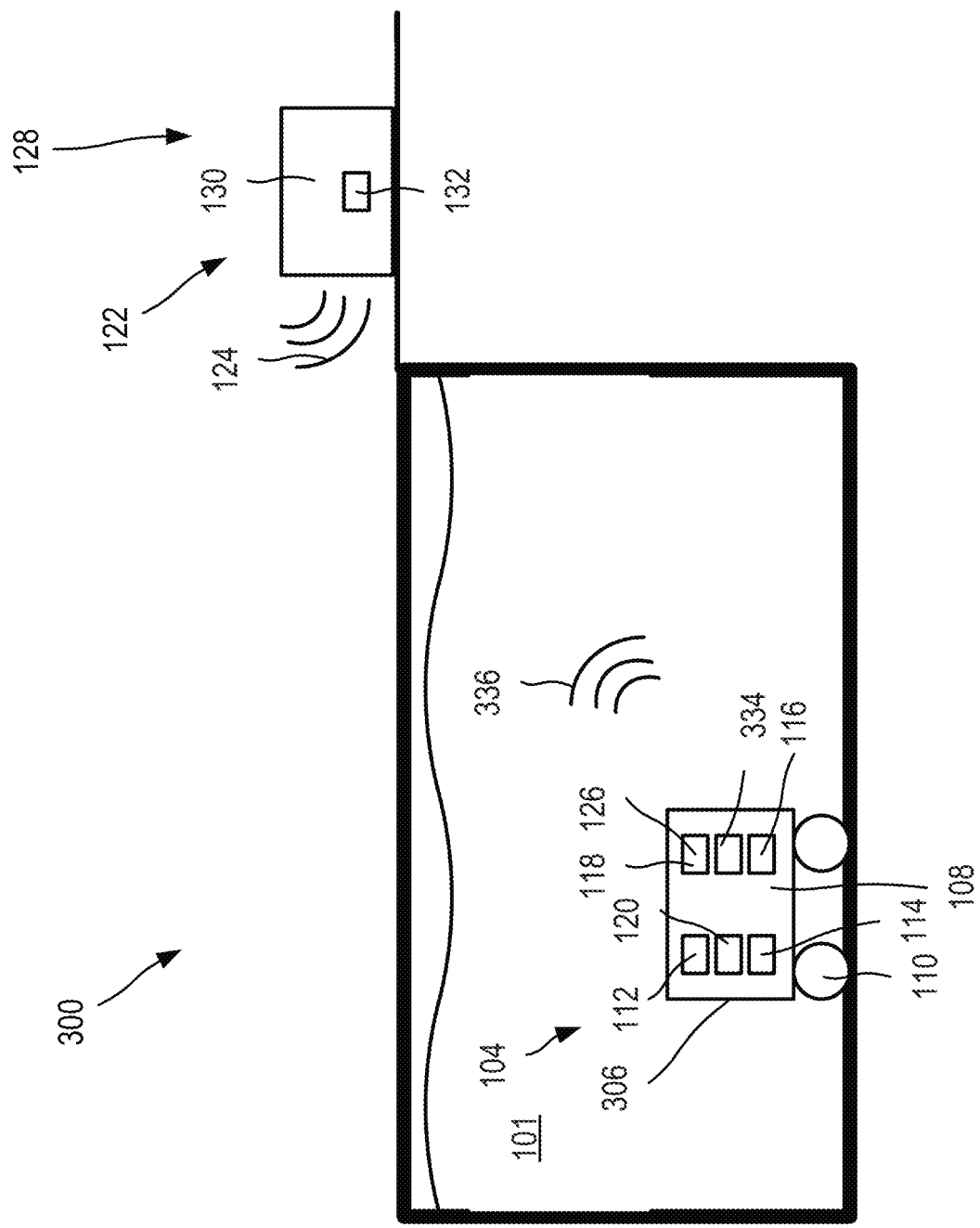
FIG. 3 illustrates a pool system with a communication system according to embodiments of the disclosure.

FIG. 3 illustrates another example of a pool system 300 according to various embodiments. The pool system 300 is substantially similar to the pool system 100 except that the piece of equipment 104 is an APC 306 that is substantially similar to the APC 106 but further includes an onboard sound generator 334. In this embodiment, the sound generator 334 may selectively generate a sound or other signal 336. Optionally, the signal 336 is generated by the sound generator 334 responsive to a sound 124 from the sound generator 122, although it need not. In certain embodiments, the sound generator 334 may allow for the APC 306 to "talk back" to a microphone or other communication sensor located within or outside the pool, including, but not limited to, a microphone or other communication sensor on or associated with the sound generator 122. In other embodiments, other forms of communication from the APC to external devices could be used instead.

In some embodiments, the APC 106 or 306 is configured to enter a quiet mode, whereby the electric motor 112 and/or the pump 114 and/or other subcomponents of the APC 106 or 306 are de-energized so the communication sensor(s) 118 are able to receive the signal from the source without interference from noise generated by the electric motor 112 or other subcomponents. In some cases, the APC 106 is configured to enter the quiet mode (e.g., the motor and/or other components are turned off so the APC 106 is in a listening mode) when the APC 106 ends a cleaning cycle. In other embodiments, the APC 106 may be preprogrammed to enter a quiet mode at predetermined intervals. In yet other embodiments, the APC 106 may be switched to quiet mode as desired via the controller 120.

As mentioned, the communication systems 103 described herein may be used to control the piece of equipment 104 and/or determine other characteristics of the pool system 100. As one non-limiting example, the communication system 103 may be used to facilitate determination of the orientation of the APC 106 within the water 101 and/or the direction of the sound from the source using the communication sensor(s) 118. For example, two or more microphones, ultrasonic transducers, and/or other receivers as communication sensor 118 spaced about the APC 106 (optionally on the same APC 104) and receiving the same signal from the source at different times may be used to calculate the relative distances of the communication sensor(s) 118 from the source (e.g., a single sound generator 122), thereby providing information about the orientation of the APC 106 within the body of water 101 and/or about the direction of the source of the sound. More specifically, the ACP 106 can determine the direction from where the sound emanates and/or orientation of the APC 106 through triangulation/the difference in time of arrival to each microphone or other communication sensor 118 of the sound. With three or more communications sensors 118, an absolute direction for the sound source can be determined and acted upon through triangulation using the difference of arrival time of the sound signal to the three or more communication sensors 118.

In other embodiments, the communication sensor(s) 118 may be utilized to provide additional information about the APC 106 as desired. In an alternative embodiment, one or more microphones, ultrasonic transducers, and/or other receivers as communication sensor 118 may be positioned on a charging/base station, in which case the base station determines the direction of the sound and/or an orientation of the APC 106 through the same means.

As another non-limiting example, in embodiments with a plurality of sound generators 122, when the one or more communication sensors 118 receive two separate signals, the difference in receipt times may allow calculation of relative distances of the APC 106 from each of the sources, hence supplying information as to the location of the APC 106 within the water 101. As another non-limiting embodiment, two spaced microphones 126 (optionally on the same APC 104) receiving the same signal at different times may be used to calculate the relative distances of the microphones 126 from the source (e.g., a single sound generator 122), thereby providing information about the location of the APC 106 relative to the source. In other embodiments, the communication sensor(s) 118 may be utilized to provide additional information about the APC 106 as desired.

In certain embodiments, information or data may be communicated with the APC 106 based on at least one characteristic of the sound (or other) signals. The at least one characteristic of the sound 124 may include, but is not limited to, a pattern of the sound 124, a volume of the sound 124, a frequency of the sound 124, a duration of the sound 124, a location that the sound 124 originates from, a pitch of the sound 124, voice recognition parameter data of the sound 124 (e.g., a parameter of a person's voice when speaking), combinations thereof, or other suitable characteristics as desired. In these embodiments, the controller 120 may receive the at least one characteristic of the sound 124, determine a corresponding control action based on the at least one characteristic of the sound 124, and control the APC 106 based on the determined control action. In certain examples, the controller 120 may optionally perform voice recognition on the at least one characteristic and may control the APC 106 based on such voice recognition. Additional non-limiting examples of such control by the controller 120 are provided below, but other types of control are possible, and the examples are merely provided for illustrative purposes.

In one non-limiting example, the robotic APC 106 within a swimming pool may be signaled when a homeowner or other pool user or technician desires to remove the APC 106 from the pool by generating a sound 124 having a pattern of taps (e.g., six taps) of short duration. In this example, the signals may instruct the APC 106 to begin movement along the bottom surface of the pool until it reaches any upstanding wall and then climb the wall for presentation to the user at the waterline of the pool. In another non-limiting example, the APC 106 may be instructed to turn toward the user and move within the pool until it reaches the wall closest to the user, following which it climbs the wall for presentation at the waterline. In this embodiment, the human or sound generator may generate a sound 124 having another pattern of taps (e.g., three taps) of long duration. In the first example, the user must walk along the pool deck to retrieve the APC 106 at the waterline, whereas in the second circumstance, the APC 106 presents itself for retrieval in the immediate vicinity of the user.

As a further non-limiting example, the controller 120 may be configured to recognize signals from the communication sensor 118 corresponding to numbers of audible pulses of sound 124 made by foot stomps. For example, sound 124 created by two (or other number of) foot stomps in succession on the pool deck may be received by the communication sensor 118 and converted into signals recognized by the controller 120 as an instruction to "wake up" and energize components to prepare to receive further instructions. In this example, the controller 120 may optionally activate the motive elements 110 briefly to cause the APC 106 to move slightly within the water 101 of the pool, effectively providing a visual acknowledgment that the "wake up" instruction was received and processed. Should the communication sensor 118 of the APC 106 of this example then receive sounds corresponding to four (or other number of) foot stomps in succession, the controller 120 may interpret the information as an instruction to commence generally-linear movement until an upstanding wall is sensed and then to climb the wall for presentation of the APC 106 at the waterline. By contrast, if upon waking the APC 106 is not oriented in a preferred manner, the human may supply three (or other number of) foot stomps in succession to cause the APC 106 to rotate approximately 45°. Additional iterations of three (or other number of) foot stomps each may cause a further rotation of approximately 45° (in the same clockwise or counter-clockwise manner) until the APC 106 is oriented as desired, following which four (or other number of) foot stomps may commence linear movement of the device.

As another non-limiting example, the robotic APC 106 within a swimming pool may be signaled by a person's voice. For example, when a homeowner or other pool user or technician desires to remove the APC 106 from the pool, they may speak to the APC 106 as a sound 124 with the instructions that the user wants the APC 106 to perform. The controller 120 may recognize such instructions and may cause the APC 106 to perform the action accordingly. Recognizing the instructions may be any voice recognition technique as desired, including, but not limited to, comparing the received instructions to predefined or preprogrammed instructions. Optionally, the APC 106 with the voice recognition may allow for a layer of security and/or safety using voice verification such that only authorized users may control the APC 106. For example, an unauthorized user and an authorized user may speak the same command to the APC 106, but the controller may only control the APC 106 pursuant to the authorized user's command based on voice recognition of the authorized user. As another non-limiting example, a child (e.g., an unauthorized user) may tell the APC 106 to surface while a parent (e.g., an authorized user) may tell the APC 106 to stay submerged, and the APC 106 will stay submerged pursuant to the parent's voice instructions (or stay submerged even in the absence of the parent's voice instructions since the surface instructions were given by an unauthorized user).

Although the foregoing examples are useful in describing aspects of the invention, persons skilled in the art will recognize that the invention is not limited to use of any particular ones of the disclosed actions. As noted above, sounds need not necessarily be audible, nor need they necessarily be created by foot stomping outside the pool. Further, the sounds need not necessarily be discrete pulses or, if discrete pulses, need not be simply two, three, or four pulses as used in the example. Yet further, sounds may provide other instructions to an APC, such as (but not limited to) stopping movement, changing speed of movement, changing direction of linear or rotational movement, etc.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration A. A method of communicating with an automatic swimming pool cleaner at least partially submerged within water of a swimming pool, comprising creating a sound configured for receipt by a sound-receiving means of the automatic swimming pool cleaner.

Illustration B. A method of any preceding or subsequent illustrations or combination of illustrations in which the sound-receiving means comprises a microphone or an ultrasonic transducer.

Illustration C. A method of any preceding or subsequent illustrations or combination of illustrations in which the sound is created externally of the swimming pool and furnishes an operating instruction to the automatic swimming pool cleaner.

Illustration D. A method of any preceding or subsequent illustrations or combination of illustrations in which the operating instruction is selected from the group consisting of: making linear movements, making rotational movements, or energizing components.

Illustration E. An automatic swimming pool cleaner comprising means for receiving and processing sounds.

Illustration F. An automatic swimming pool cleaner comprising a microphone or ultrasonic transducer for receiving audible or ultrasonic signals, respectively.

Illustration G. An automatic swimming pool cleaner comprising: a housing, a communication sensor, and a controller, wherein the automatic swimming pool cleaner is configured to be at least partially submerged within water of a swimming pool, wherein the communication sensor is configured to receive a sound signal while the automatic swimming pool is at least partially submerged, and wherein the controller is configured to: receive an electrical signal from the communication sensor, the electrical signal comprising at least one characteristic, determine a control response for the automatic swimming pool cleaner based on the at least one characteristic; and control the automatic swimming pool cleaner pursuant to the determined control response.

Illustration H The automatic swimming pool cleaner of any preceding or subsequent illustrations or combination of illustrations, wherein the communication sensor comprises at least one of a microphone or an ultrasonic transducer.

Illustration I. The automatic swimming pool cleaner of any preceding or subsequent illustrations or combination of illustrations, wherein the communication sensor is configured to receive at least one of an audible sound or an ultrasonic sounds as the sound signal.

Illustration J The automatic swimming pool cleaner of any preceding or subsequent illustrations or combination of illustrations, wherein the communication sensor is within the housing.

Illustration K. The automatic swimming pool cleaner of any preceding or subsequent illustrations or combination of illustrations, wherein the communication sensor is on a printed circuit board within a motor block of the housing.

Illustration L. The automatic swimming pool cleaner of any preceding or subsequent illustrations or combination of illustrations, further comprising a sound generator that is configured to generate a sound signal having at least one characteristic.

Illustration M. The automatic swimming pool cleaner of any preceding or subsequent illustrations or combination of illustrations, wherein the communication sensor is a first sensor configured to receive a sound signal, and wherein the automatic swimming pool cleaner further comprises a second sensor spaced apart from the first sensor and configured to receive the sound signal, wherein at least one of an orientation of the swimming pool cleaner within the water of the swimming pool or spa or a direction of the sound signal can be determined based on a difference in time of arrival of the sound signal to each of the first sensor and the second sensor.

Illustration N. The automatic swimming pool cleaner of any preceding or subsequent illustrations or combination of illustrations, wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration O. The automatic swimming pool cleaner of any preceding or subsequent illustrations or combination of illustrations, further comprising a motor, a pump, a debris filter, and at least one motive element.

Illustration P. A pool system comprising an automatic swimming pool cleaner, the automatic swimming pool cleaner comprising a housing, a communication sensor, and a controller, wherein the automatic swimming pool cleaner is configured to be at least partially submerged within water of a swimming pool, wherein the communication sensor is configured to receive a sound signal while the automatic swimming pool is at least partially submerged, and wherein the controller is configured to control the automatic swimming pool cleaner responsive to the received sound signal.

Illustration Q. The pool system of any preceding or subsequent illustrations or combination of illustrations, further comprising a sound generator configured to generate the sound signal, wherein the sound generator is remote from the automatic swimming pool cleaner, and wherein the sound signal provides an operating instruction to the automatic swimming pool cleaner.

Illustration R. The pool system of any preceding or subsequent illustrations or combination of illustrations, wherein the sound generator is external to the swimming pool such that the sound generator is not submerged in water.

Illustration S. The pool system of any preceding or subsequent illustrations or combination of illustrations, wherein the communication sensor comprises at least one of a microphone or an ultrasonic transducer.

Illustration T. The pool system of any preceding or subsequent illustrations or combination of illustrations, wherein the controller is configured to control the automatic swimming pool cleaner pursuant to a control response, and wherein the control response comprises at least one of making linear movements with the automatic swimming pool cleaner, making rotational movements of the swimming pool cleaner, energizing components of the automatic swimming pool cleaner, or de-activating components of the automatic swimming pool cleaner.

Illustration U. A method of controlling an automatic swimming pool cleaner within a pool, the method comprising receiving a sound signal using a communication sensor on the automatic swimming pool cleaner, the sound signal comprising at least one characteristic; determining a control response using a controller on the automatic swimming pool cleaner based on the received sound signal and the at least one characteristic; and controlling the automatic swimming pool cleaner pursuant to the determined control response.

Illustration V. The method of any preceding or subsequent illustrations or combination of illustrations, further comprising generating the sound signal externally of the swimming pool, wherein the sound signal furnishes an operating instruction to the automatic swimming pool cleaner.

Illustration W. The method of any preceding or subsequent illustrations or combination of illustrations, further comprising generating the sound signal within the swimming pool and remote from the automatic swimming pool cleaner, wherein the sound signal furnishes an operating instruction to the automatic swimming pool cleaner.

Illustration X. The method of any preceding or subsequent illustrations or combination of illustrations, wherein receiving the sound signal comprises receiving at least one of an audible sound or an ultrasonic sound.

Illustration Y. The method of any preceding or subsequent illustrations or combination of illustrations, wherein the at least one characteristic comprises at least one of a pattern of the sound signal, a volume of the sound signal, a type of sound signal, a frequency of the sound signal, a duration of the sound signal, or an origin location of the sound signal.

Illustration Z. The method of any preceding or subsequent illustrations or combination of illustrations, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration AA. A method of controlling an automatic swimming pool cleaner within a pool, the method comprising: causing the automatic swimming pool cleaner to enter a quiet mode, whereby a motor of the automatic swimming pool cleaner is de-energized; listening for a sound signal using a communication sensor on the automatic swimming pool cleaner, the sound signal comprising at least one characteristic; and controlling the automatic swimming pool cleaner based on the at least one characteristic of the sound signal.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. An automatic swimming pool cleaner comprising:
a housing, a communication sensor, and a controller,
wherein the automatic swimming pool cleaner is configured to be at least partially submerged within water of a swimming pool or spa,
wherein the communication sensor is configured to receive a sound signal at the automatic swimming pool cleaner while the automatic swimming pool is at least partially submerged, wherein the sound signal is a non-verbal, mechanically-generated sound signal formed by at least one of a user or a mechanical sound maker using a physical mechanism to create the sound signal, wherein the sound signal furnishes an operation instruction to the automatic swimming pool cleaner, and
wherein the controller is configured to:
receive an electrical signal from the communication sensor based on the sound signal, the electrical signal comprising at least one characteristic corresponding to the operation instruction;
determine a control response for the automatic swimming pool cleaner based on the at least one characteristic; and
initiate control of the automatic swimming pool cleaner pursuant to the determined control response.

2. The automatic swimming pool cleaner of claim 1, wherein the communication sensor comprises at least one of a microphone or an ultrasonic transducer.

3. The automatic swimming pool cleaner of claim 1, wherein the communication sensor is configured to receive at least one of an audible sound or an ultrasonic sound as the sound signal.

4. The automatic swimming pool cleaner of claim 1, wherein the communication sensor is within the housing.

5. The automatic swimming pool cleaner of claim 4, wherein the communication sensor is on a printed circuit board within a motor block of the housing.

6. The automatic swimming pool cleaner of claim 1, further comprising a sound generator that is configured to generate one or more sound signals, each of the one or more sound signals having at least one characteristic.

7. The automatic swimming pool cleaner of claim 1, wherein the communication sensor is a first sensor configured to receive a sound signal, and wherein the automatic swimming pool cleaner further comprises a second sensor spaced apart from the first sensor and configured to receive the sound signal, wherein at least one of an orientation of the swimming pool cleaner within the water of the swimming pool or spa or a direction of the sound signal can be determined based on a difference in arrival time of the sound signal to each of the first sensor and the second sensor.

8. The automatic swimming pool cleaner of claim 1, wherein the control response comprises one or more of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

9. The automatic swimming pool cleaner of claim 1, wherein the controller is further configured to:
compare the at least one characteristic of the sound signal with a plurality of characteristics, each characteristic of the plurality of characteristics being associated with a corresponding type of operating instruction of a plurality of types of operating instructions for the automatic swimming pool cleaner;
determine, based on the comparison, the type of operating instruction furnished by the sound signal and whether an operating instruction is furnished; and
initiate control of the automatic swimming pool cleaner pursuant to the determined type of operating instruction.

10. A pool system comprising:
a mechanical sound maker comprising a physical mechanism to create the sound signal; and
an automatic swimming pool cleaner comprising:
a housing, a communication sensor, and a controller,
wherein the automatic swimming pool cleaner is configured to be at least partially submerged within water of a swimming pool,
wherein the communication sensor is configured to receive the sound signal from at least one of the mechanical sound maker or a user, wherein the sound signal is a non-verbal, mechanically-generated sound signal, the sound signal furnishing an operation instruction to the automatic swimming pool cleaner while the automatic swimming pool is at least partially submerged, and
wherein the controller is configured to control the automatic swimming pool cleaner responsive to the received sound signal by identifying the operating instruction based on at least one characteristic of the sound signal and controlling the automatic swimming pool cleaner pursuant to the identified operating instruction.

11. The pool system of claim 10, further comprising a sound generator configured to generate the sound signal, wherein the sound generator is remote from the automatic swimming pool cleaner, and wherein the sound signal provides the operating instruction to the automatic swimming pool cleaner.

12. The pool system of claim 11, wherein the sound generator is external to the swimming pool such that the sound generator is not submerged in water.

13. The pool system of claim 10, wherein the communication sensor comprises at least one of a microphone or an ultrasonic transducer.

14. The pool system of claim 10, wherein the controller is configured to control the automatic swimming pool cleaner pursuant to a control response, and wherein the control response comprises at least one of making linear movements with the automatic swimming pool cleaner, making rotational movements of the automatic swimming pool cleaner, energizing components of the automatic swimming pool cleaner, or de-activating components of the automatic swimming pool cleaner.

15. A method of controlling an automatic swimming pool cleaner within a pool, the method comprising:
receiving a sound signal using a communication sensor on the automatic swimming pool cleaner, the sound signal comprising at least one characteristic, wherein the sound signal is a non-verbal, mechanically-generated sound signal formed by at least one of a user or a mechanical sound maker using a physical mechanism to create the sound signal;
determining a control response using a controller on the automatic swimming pool cleaner based on the received sound signal and the at least one characteristic; and
controlling the automatic swimming pool cleaner pursuant to the determined control response.

16. The method of claim 15, further comprising generating the sound signal externally of the pool, wherein the sound signal furnishes an operating instruction to the automatic swimming pool cleaner.

17. The method of claim 15, further comprising generating the sound signal within the swimming pool and remote from the automatic swimming pool cleaner, wherein the sound signal furnishes an operating instruction to the automatic swimming pool cleaner.

18. The method of claim 15, wherein receiving the sound signal comprises receiving at least one of an audible sound or an ultrasonic sound.

19. The method of claim 15, wherein the at least one characteristic comprises at least one of a pattern of the sound signal, a volume of the sound signal, a type of sound signal, a frequency of the sound signal, a duration of the sound signal, or an origin location of the sound signal.

20. The method of claim 15, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

21. A method of communicating with an automatic swimming pool cleaner at least partially submerged within water of a swimming pool or spa, comprising creating a sound configured for receipt by a sound-receiving means on the automatic swimming pool cleaner, the sound comprising at least one characteristic furnishing instructions to the automatic swimming pool cleaner, wherein the sound signal is a non-verbal, mechanically-generated sound signal formed by at least one of a user or a mechanical sound maker using a physical mechanism to create the sound signal.

22. The method of claim 21, wherein the sound-receiving means comprises a microphone or an ultrasonic transducer.

23. The method of claim 21, wherein creating the sound comprises creating the sound externally of the swimming pool.

24. The method of claim 23, wherein the operating instruction is selected from the group consisting of: making linear movements; making rotational movements: energizing components; surfacing the automatic swimming pool cleaner; and deactivating components of the automatic swimming pool cleaner.

25. A submersible automatic swimming pool cleaner comprising means on the submersible automatic swimming pool cleaner for receiving and processing a sound signal, wherein the sound signal is a non-verbal, mechanically-generated sound signal formed by at least one of a user or a mechanical sound maker using a physical mechanism to create the sound signal, the sound signal comprising at least one characteristic furnishing an operation instruction to the automatic swimming pool cleaner.

26. The automatic swimming pool cleaner of claim 25, further comprising a microphone or ultrasonic transducer for receiving audible or ultrasonic signals, respectively.

27. The automatic swimming pool cleaner of claim 25, wherein the means for receiving and processing sounds is configured to receive a sound signal while the automatic swimming pool is at least partially submerged and determine a control response for the automatic swimming pool cleaner based on at least one characteristic of the sound signal.

28. The automatic swimming pool cleaner of claim 27, wherein the control response is selected from the group consisting of making linear movements; making rotational movements; energizing components; surfacing the automatic swimming pool cleaner; and deactivating components of the automatic swimming pool cleaner.

29. A method of controlling an automatic swimming pool cleaner within a pool, the method comprising:
causing the automatic swimming pool cleaner to enter a quiet mode, whereby a motor of the automatic swimming pool cleaner is de-energized;
responsive to entering the quiet mode and while the automatic swimming pool cleaner is in the quiet mode, listening, by the automatic swimming pool cleaner, for a sound signal using a communication sensor on the automatic swimming pool cleaner, the sound signal comprising at least one characteristic; and
controlling the automatic swimming pool cleaner based on the at least one characteristic of the sound signal.

* * * * *